United States Patent
Andreoli-Fang et al.

(10) Patent No.: US 12,052,787 B2
(45) Date of Patent: Jul. 30, 2024

(54) CONVERGED CORE COMMUNICATION NETWORKS AND ASSOCIATED METHODS

(71) Applicant: CABLE TELEVISION LABORATORIES, INC., Louisville, CO (US)

(72) Inventors: Jennifer Andreoli-Fang, Boulder, CO (US); Bernard McKibben, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/367,997

(22) Filed: Mar. 28, 2019

(65) Prior Publication Data

US 2019/0306907 A1    Oct. 3, 2019

Related U.S. Application Data

(60) Provisional application No. 62/722,380, filed on Aug. 24, 2018, provisional application No. 62/678,920, (Continued)

(51) Int. Cl.
| | |
|---|---|
| *H04W 76/16* | (2018.01) |
| *H04L 9/40* | (2022.01) |
| *H04L 12/66* | (2006.01) |
| *H04L 41/02* | (2022.01) |
| *H04L 41/0806* | (2022.01) |
| *H04L 41/0894* | (2022.01) |
| *H04L 41/0895* | (2022.01) |
| *H04L 41/40* | (2022.01) |
| *H04L 41/5041* | (2022.01) |

(Continued)

(52) U.S. Cl.
CPC .............. *H04W 76/16* (2018.02); *H04L 12/66* (2013.01); *H04L 41/02* (2013.01); *H04L 41/5041* (2013.01); *H04W 28/16* (2013.01); *H04W 88/16* (2013.01); *H04L 63/08* (2013.01); *H04W 12/06* (2013.01)

(58) Field of Classification Search
CPC ..... H04W 76/16; H04W 28/16; H04W 88/16; H04W 12/06; H04L 12/66; H04L 41/02; H04L 41/5041; H04L 63/08
USPC .......................................................... 370/401
See application file for complete search history.

(56) References Cited

U.S. PATENT DOCUMENTS

2010/0130171 A1   5/2010  Palanigounder et al.
2012/0265888 A1*  10/2012 Roeland ................ H04M 15/66
                                                    709/228

(Continued)

FOREIGN PATENT DOCUMENTS

WO   WO-2017133471 A1 *  8/2017  ......... H04L 27/0006
WO   WO-2018196587 A1 * 11/2018  ............ H04W 12/06

*Primary Examiner* — Xuan Lu
(74) *Attorney, Agent, or Firm* — PdZ Patent Law, PLLC

(57) ABSTRACT

A method for supporting communication links includes (a) supporting a wireless communication link using a plurality of network functions logically linked via a common interface, (b) supporting a wireline communication link using a wireline access network, and (c) sharing one or more of the plurality of network functions with the wireline access network. A converged core communication network includes a memory subsystem and a processing subsystem configured to execute instructions stored in the memory subsection to perform the method for supporting communication links.

9 Claims, 9 Drawing Sheets

Related U.S. Application Data filed on May 31, 2018, provisional application No. 62/659,200, filed on Apr. 18, 2018, provisional application No. 62/655,213, filed on Apr. 9, 2018, provisional application No. 62/649,284, filed on Mar. 28, 2018.

(51) Int. Cl.
  *H04W 12/06* (2021.01)
  *H04W 28/16* (2009.01)
  *H04W 88/16* (2009.01)

(56) References Cited

U.S. PATENT DOCUMENTS

| | | | |
|---|---|---|---|
| 2013/0067082 A1 | 3/2013 | Khan | |
| 2015/0092531 A1 | 4/2015 | Bernstein et al. | |
| 2017/0332421 A1* | 11/2017 | Sternberg | H04W 12/069 |
| 2018/0199115 A1 | 7/2018 | Prasad | |
| 2018/0199160 A1* | 7/2018 | Edge | H04W 4/029 |
| 2018/0227871 A1* | 8/2018 | Singh | H04W 60/04 |
| 2019/0052580 A1* | 2/2019 | Peng | H04L 61/2592 |
| 2019/0150225 A1* | 5/2019 | Mohamed | H04W 4/70 |
| | | | 370/329 |
| 2019/0223252 A1 | 7/2019 | Zhou et al. | |
| 2019/0281522 A1* | 9/2019 | Wong | H04W 76/10 |
| 2019/0373441 A1* | 12/2019 | Ryu | H04W 68/005 |
| 2020/0053131 A1* | 2/2020 | Li | H04L 63/08 |
| 2020/0053802 A1* | 2/2020 | Li | H04L 41/5041 |
| 2020/0068385 A1* | 2/2020 | Yu | H04L 45/38 |
| 2020/0252837 A1 | 8/2020 | Kim et al. | |
| 2020/0322884 A1* | 10/2020 | Di Girolamo | H04W 4/70 |
| 2020/0336305 A1* | 10/2020 | Li | H04W 12/06 |
| 2021/0021981 A1* | 1/2021 | Lauster | H04W 36/0066 |
| 2021/0058748 A1* | 2/2021 | Liao | H04L 12/189 |

\* cited by examiner

CONVERGED CORE COMMUNICATION NETWORKS AND ASSOCIATED METHODS

RELATED APPLICATIONS

This application claims benefit of priority to (a) U.S. Provisional Patent Application Ser. No. 62/649,284, filed Mar. 28, 2018, (b) U.S. Provisional Patent Application Ser. No. 62/655,213, filed Apr. 9, 2018, (c) U.S. Provisional Patent Application Ser. No. 62/659,200, filed Apr. 18, 2018, (d) U.S. Provisional Patent Application Ser. No. 62/678,920, filed May 31, 2018, and (e) U.S. Provisional Patent Application Ser. No. 62/722,380, filed Aug. 24, 2018. Each of the aforementioned applications is incorporated herein by reference.

BACKGROUND

Wireless communication networks and wireline communication networks are ubiquitous in modern society. These networks typically operate according to standard protocols, such as to facilitate interoperability of network devices from different vendors. However, wireless communication networks typically use different protocols than wireline communication networks. Examples of wireless communication network protocols include long term evolution (LTE) protocols and fifth generation (5G) new radio (NR) protocols. Examples of wireline communication protocols include data over cable service interface specification (DOCSIS) protocols, digital subscriber line (DSL) protocols, ethernet passive optical network (EPON) protocols, gigabit passive optical network (GPON) protocols, and radio frequency over glass (RFOG) protocols.

A control portion of a communication network is commonly referred to as the core communication network. A core communication network is configured to handle, for example, user equipment (UE) device authentication, data management, accounting and billing, and/or data session instantiation and management.

DETAILED DESCRIPTION OF THE EMBODIMENTS

While a wireless communication network and a wireline communication network may share some common infrastructure, the wireless core communication network and the wireline core communication network are conventionally separate and isolated entities. Additionally, wireless and wireline communication networks conventionally use (a) different credentials to authenticate and authorize devices, (b) different data management techniques, (c) different accounting and billing systems, and (d) different policies to instantiate and manage data sessions. The need to support these respective functions for each communication network results in significant complexity and cost.

Disclosed herein are core communication networks and associated methods which at least partially overcome one or more of the problems discussed above. The new core communication networks are configured to at least partially control both a wireless communication network and a wireline communication network, and the new core communication networks are therefore referred to as "converged" core communication networks. The converged core communication networks may advantageously enable at least partial sharing of one or more core communication network functions, thereby promoting economy, simplicity, and tight integration of wireless and wireline communication networks. For example, some embodiments are configured to (a) authenticate, authorize, and/or register both wireless devices and wireline devices and their respective subscriptions, (b) instantiate network slices on either a wireless device or a wireline device, (c) create and manage wireless and wireline data sessions with matching Quality of Service (QoS) traffic management policy, based on a common set of policies for both a wireless and wireline communication network, and/or (d) expose structured user data, irrespective of whether a user's device is connected to the wireless or wireline communication network, in a unified and controlled manner. Additionally, some embodiments of the converged core communication networks are at least partially backward compatible with legacy communication networks, thereby helping minimize required change to existing infrastructure.

Figure 1:
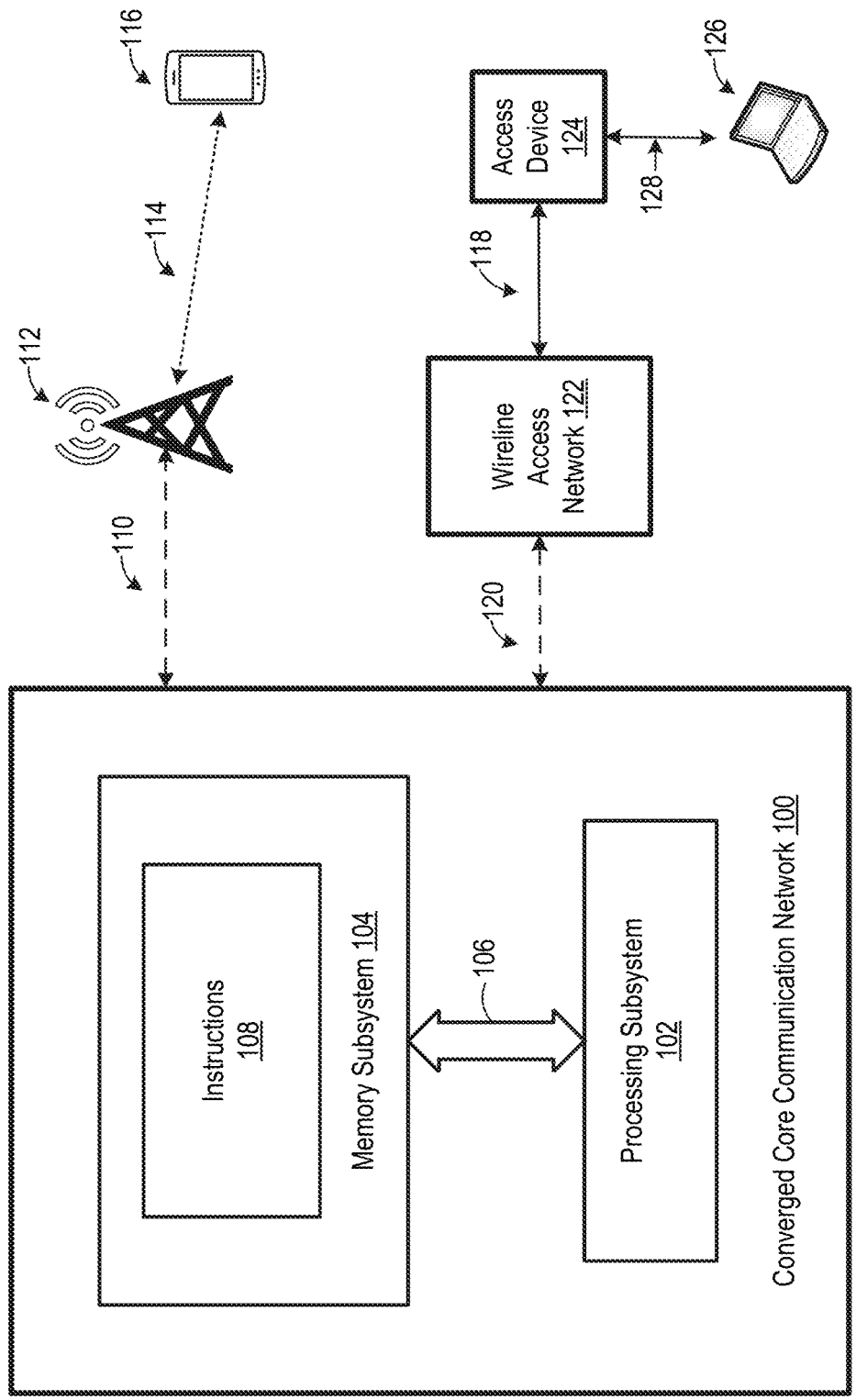
FIG. 1 is a block diagram illustrating a converged core communication network supporting wireline and wireless communication links, according to an embodiment.

FIG. 1 is a block diagram illustrating a converged core communication network 100 supporting wireless and wireline communication links. Converged core communication network 100 is one embodiment of the new converged core communication networks developed by Applicant, and converged core communication network 100 includes a processing subsystem 102 and a memory subsystem 104. Processing subsystem 102 is communicatively coupled 106 to memory subsystem 104, and processing subsystem 102 is configured to execute instructions 108 stored in memory subsystem 104 to perform the functions of converged core communication network 100, e.g. to provide the network functions depicted in FIG. 2 (discussed below). Although each of processing subsystem 102 and memory subsystem 104 is symbolically shown as a single element, processing subsystem 102 and memory subsystem 104 may include multiple elements. For example, processing subsystem 102 may include multiple processors, and memory subsystem 104 may include multiple memory modules. Additionally, constituent components of each of processing subsystem 102 and memory subsystem 104 need not be disposed at single location; instead, the constituent components may be disposed at multiple locations, e.g. in multiple data centers in different geographic locations. Furthermore, processing subsystem 102 and memory subsystem 104 could be replaced with alternative components performing similar functionality, such as analog and/or digital electronic circuitry, without departing from the scope hereof.

Converged core communication network 100 is configured to support both wireless communication links and wireline communication links. For example, FIG. 1 illustrates converged core communication network 100 being coupled to a wireless base station 112 via a logical link 110, to support a wireless communication link 114 with a UE device 116. Logical link 110 may include a plurality of logical links, such as a 5G NR NG2 logical link and a NG3 logical link. Wireless base station 112 includes, for example, a LTE base station (e.g., an eNB device), a 5G NR base station (e.g., a gNB device), a sixth Generation (6G) wireless communication base station, a Wi-Fi base station (e.g., including unscheduled, partially scheduled, and unscheduled systems), or variations and/or extensions thereof.

Converged core communication network 100 also supports a wireline communication link 118 via a logical link 120 with a wireline access network 122. Logical link 120 may include a plurality of logical links, such as discussed below with respect to FIG. 2. Wireline access network 122 includes, for example, a cable modem termination system (CMTS), a digital subscriber line access multiplexer (DSLAM), or an optical line terminal (OLT). However, wireline access network 122 is not limited to these configurations; instead, wireline access network 122 could have any configuration as long as it is compatible with converged core communication network 100. Wireline communication link 118 communicatively couples an access device 124 to wireline access network 122, and wireline communication link 118 includes, for example, an optical cable or an electrical cable such as a coaxial cable or a twisted pair cable. Additionally, in some embodiments, wireline communication link 118 is hybrid of two or more communication media, such as a hybrid optical cable and coaxial cable (HFC) wireline communication link or a hybrid optical cable and twisted pair cable wireline communication link. Access device 124 is, for example, a cable modem (e.g. operating according to a DOCSIS protocol), a DSL modem, or an optical network unit (ONU) (e.g., operating according to an EPON protocol, a RFOG protocol, or a GPON protocol), or any other device capable of terminating wireline communication link 118. Access device 124 may also be incorporated into another device, such as a premises gateway which provides networking functionality (wireless and/or wired) in addition to wireline communication network access. A UE device 126 is communicatively coupled to access device 124 via a communication link 128, where communication link 128 is a wireless (e.g., Wi-Fi, LTE, 5G NR, or 6G) and/or wireline (e.g., electrical or optical cable) communication link. In some alternate embodiments, access device 124 is itself a UE device capable of connecting to wireline communication link 118.

Converged core communication network 100 provides UE devices 116 and 126 with access to one or more network services, e.g., the Internet, video services, audio services, voice over Internet Protocol (VOIP) services, gaming services, and/or conferencing services. Examples of each of UE device 116 and 126 include, but are not limited to, a computer, a set-top device, a data storage device, an Internet of Things (IoT) device, an entertainment device, a wireless access point (including, for example, eNBs, gNBs, and Wi-Fi APS acting as UEs), a computer networking device, a mobile telephone, a smartwatch, a wearable device with wireless capability, and a medical device.

Although converged core communication network 100 is depicted for illustrative simplicity as supporting only a single wireless communication link 114 and a single wireline communication link 118, converged core communication network 100 could be configured to support a plurality of wireless and/or or wireless communication links without departing from the scope hereof. For example, some embodiments of converged core communication network 100 are capable of supporting hundreds, thousands, tens of thousands, or even more wireless and/or wireline communication links. Similarly, while only two UE devices 116 and 126 are depicted in FIG. 1 for illustrative clarity, converged core communication network 100 could support additional UE devices without departing from the scope hereof. Furthermore, although FIG. 1 illustrates wireless communication link 114 and wireline communication link 118 as being separate entities, in some embodiments, wireless communication link 114 and wireline communication link 118 are part of a common communication path. Moreover, wireless communication link 114 and wireline communication link 118 could support a common UE device, such as to provide a high-bandwidth communication to the UE device.

Figure 2:
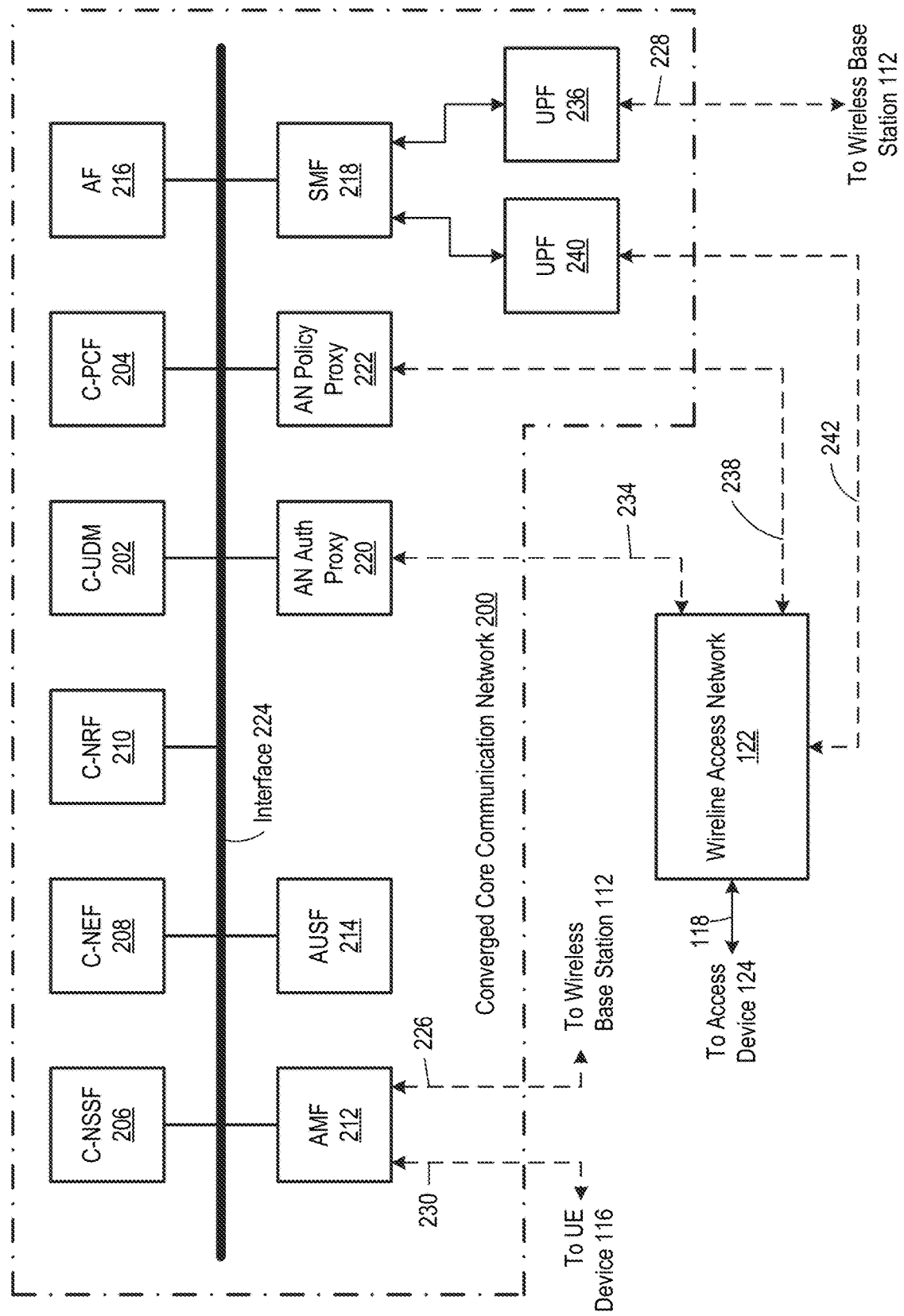
FIG. 2 is a block diagram illustrating logical elements of one embodiment of the converged core communication network of FIG. 1.

FIG. 2 is a block diagram illustrating logical elements, e.g. network functions, of a converged core communication network 200, which is one embodiment of converged core communication network 100. In particular embodiments, processing subsystem 102 executes instructions 108 to provide the network functions illustrated in FIG. 2. In the illustrated embodiment, converged core communication network 200 provides at least the following network functions: (1) a converged unified data management (C-UDM) 202, (2) a converged policy control function (C-PCF) 204, (3) a converged network slice function (C-NSSF) 206, (4) a converged network exposure function (C-NEF) 208, (5) a converged network repository function (C-NRF) 210, (6) an access management mobility function (AMF) 212, (7) an authentication server function (AUSF) 214, (8) an application function (AF) 216, (9) a session management function (SMF) 218, an access network (AN) authentication proxy 220, and an policy proxy 222. These network functions are logically linked via a common interface 224. In some embodiments, common interface 224 is configured according to a representational state transfer (REST) application programming interface (API), although common interface 224 could take other forms without departing from the scope hereof.

Converged core communication network 200 could provide additional network functions and/or omit some of the network functions depicted in FIG. 2, without departing from the scope hereof. Additionally, in some embodiments, common interface 224 is communicatively coupled to additional communication networks (not shown) outside of converged core communication network 200, such as one or more of a Wi-Fi network, a fixed wireless network, a legacy wireline communication network, and a satellite network.

In particular embodiments, converged core communication network 200 directly supports wireless communication links, for example, using 5G NR protocols, 6G protocols, or extension and/or variations thereof. In some embodiments, wireless communication link 114 is directly supported by converged core communication network 200 via logical links 226 and 228 to wireless base station 112, and a logical link 230 to UE device 116, discussed below. Additionally, converged core communication network 200 supports wireline communication links, e.g. wireline communication link 118, via a wireline access network 122. In contrast to conventional approaches, wireline access network 122 shares several of the network functions of converged core communication network 200, as discussed below. Accordingly, converged core communication network 200 supports both wireless and wired communication links while helping minimize changes required to legacy wireline access networks.

C-UDM 202 holds service profiles for both wireless and wireline devices and users, e.g. for both UE device 116 using wireless communication link 114 and access device 124 using wireline communication link 118. The service profiles include, for example, identities and properties of authorized devices and/or users, as well as listings of network services and/or network service levels associated with the devices and/or users. For example, C-UDM 202 may hold identities of UE device 116 and access device 124, as well as respective network services that each device 116 and 126 is permitted to access. In some embodiments, AUSF 214 uses authentication information from C-UDM 202 to authenticate both wireless and wireline network access, e.g. AUSF authenticates both UE device 116 and access device 124, such that wireless and wireline authentication is completely converged into converged core communication network 200.

In some other embodiments, AUSF 214 is configured to obtain authentication information from C-UDM 202 to authenticate wireless network access, but wireline access network 122, instead of AUSF 214, authenticates wireline access network, to promote backward compatibility with legacy wireline access networks. In these embodiments, wireline access network 122 obtains authentication information from C-UDM 202 to authenticate wireline access devices, such as access device 124. Wireline access network 122 is optionally configured to post its authentication of an access device, e.g. authentication of access device 124, to C-UDM 202, so that converged core communication network 200 is apprised of both wireless and wireline authentication. In these embodiments, C-UDM 202 is optionally configured to link wireless authentication information and wireline authentication information of a given user with a common identification element for the user. For example, in some embodiments, C-UDM 202 is configured to link a (a) mobile network subscription ID (IMSI) and an authentication protocol (AKA) associated with a wireless UE device of a given user, and (b) a security certificate associated with a wireline access device of the user, with a common identification element for the user. Examples of the security certificate associated with the wireline access device of the user include, but are not limited to, a security certificate for a DOCSIS protocol device, a security certificate for a DSL protocol device, a security certificate for a EPON protocol device, and a security certificate for a GPON protocol device. Furthermore, in some embodiments, C-UDM 202 is configured to link additional authentication information associated with the user, e.g. user Wi-Fi authentication information, with the common identification element for the user. An example of the Wi-Fi authentication information includes, but is not limited to, a security certificate for a Wi-Fi device.

Linking of a given user's various authentication information with a common identification element promotes seamless authentication while supporting legacy wireline access network authentication. For example, C-UDM 202 may provide a user's IMSI and AKA to AUSF 214, to authenticate wireless access for a specific device at a specified data volume and throughput. C-UDM 202 may also provide the user's security certificate to wireline access network 122, for authenticating wireline communication network access for a specific device at a specified service tier. Furthermore, C-UDM 202 may be configured to provide authentication information to one or more additional communication networks (not shown), such as a Wi-Fi communication network, directly or indirectly communicatively coupled to common interface 224, to authenticate the user on such additional communication network. Moreover, linking of multiple authentication information of a given user with a common identification element helps support unified billing and subscriber traffic analysis across different communication networks, as well as facilitates handover of devices across separate communication networks that use different authentication protocols and credentials.

In some embodiments, wireline access network 122 uses a legacy interface 234 for authentication, and an AN authorization proxy 220 bridges legacy interface 234 and common interface 224, to enable wireline access network 122 to communicate with converged core communication network 200 for authentication purposes. Thus, AN authorization proxy 220 translates data between legacy interface 234 and common interface 224. AN authorization proxy 220 may be omitted in embodiments where wireless access network 122 is capable of directly using common interface 224 for authentication purposes.

C-PCF 204 is configured to apply a single traffic management policy across multiple communication networks, e.g. across both a wireless communication network and a wireline communication network, based operator rules and unified subscription information. For example, consider a scenario where UE device 116 executes an application requesting a data session traversing wireless communication link 114. In some embodiments, UE device 116 may send a request for a data session to AMF 212 via logical interface 230, which is, for example, a 5G NG1 logical interface. AMF 212 responds to the data session request by confirming with C-UDM 202 that UE device 116 is authorized to receive the data session, and AMF 212 then cooperates with SMF 218 to launch a user plane function (UPF) 236, which communicates with wireless base station 112 via logical interface 228 to provide the data session traversing wireless communication link 114. Logical interface 228 is, for example, a 5G NG3 logical interface. C-PCF 204 cooperates with wireless base station 112 to apply a predetermined traffic management policy to the data session traversing wireless communication link 114, such as based on a service profile associated with UE device 116 and stored in C-UDM 202, as well as based on operator rules, such traffic policies for pre-defined network slices.

Importantly, converged core communication network 200 shares C-PCF 204 with wireline access network 122, and in certain embodiments, wireline access network 122 uses C-PCF 204 to determine a traffic management policy for data sessions traversing wireline communication links, e.g. wireline communication link 118. For example, consider a scenario where access device 124 executes an application requesting a data session traversing wireline communication link 118. In certain embodiments, access device 124 may send a request for a data session to wireline access network 122. Wireline access network 122 then communicates with C-PCF 204 to obtain traffic policy information for the data session. Wireline access network 122 and SFM 218 cooperate to launch a UPF 240, which communicates with wireline access network 122 via a logical interface 242 to provide a data session from wireline access network 122 to one or more network services. In some embodiments, logical interface 242 is a 5G NG3 logical interface. Wireline access network 112 enforces the traffic policy information obtained from C-PCF on a data session traversing wireline communication link 118, such as based on a service profile associated with access device 124 stored in C-UDM 202, as well as based on operator rules, such traffic policies for predefined network slices. Although FIG. 2 illustrates a single SMF 218 generating UPFs for both wireless and wireline communication links, converged core communication network 200 could be modified to have a respective SMF for each communication network type.

AN policy proxy 222 bridges a legacy interface 238 and common interface 224, to enable wireline access network 122 to communicate with converged core communication network 200 for policy enforcement purposes. Thus, AN policy proxy 222 translates data between legacy interface 238 and common interface 224. Legacy interface 238 is, for example, an interface used by wireline access network 122 for policy functions. In some embodiments, legacy interface 238 operates according to a common open policy service (COPS) protocol. AN policy proxy 222 may be omitted in embodiments where wireless access network 122 is capable of directly using common interface 224 for policy enforcement services.

In some embodiments, C-PCF 204 applies a converged traffic policy across data sessions traversing both wireless communication link 114 and wireline communication 118, thereby promoting consistent user experience across both communication links. For example, in embodiments where wireless communication link 114 is a 5G NR data link and wireline communication link 118 is a DOCSIS datalink, C-PCF 204 may be configured enforce a common traffic policy by (a) setting a 5G quality class identifier (QCI) according to the common traffic policy and (b) initiating a DOCSIS service flow according to the common traffic policy. In some embodiments, C-PCF 204 is configured to support two or more simultaneous data sessions on a single device, e.g., UE device 116 or access device 124, such as to provide hybrid access (HA) to the device using two or more different communication link types.

C-NSSF 206 is configured to organize specific network segments to create one or more network slices, such as to optimize and/or compartmentalize network capabilities. Importantly, C-NSSF 206 is configured to create a single end-to-end network slice spanning two or more communication networks, e.g. spanning both a wireless communication network and wireline communication network. In particular embodiments, C-NSSF 206 is configured to provide a single QoS traffic management policy, as defined by C-PCF 204, on a single network slice spanning two or more different communication networks, e.g. spanning both wireless communication link 114 and wireline communication link 118. In some embodiments, C-NSSF 206 is configured to generate network slices optimized for a particular application, such as for a high-performance video application or a virtual reality application. Examples of network slices that may be generated by certain embodiments of C-NSSF 206 include, but are not limited to, a mobile broadband slice, a mobile transport slice, an Internet of Things (IoT) slice, a video slice, a VOW slice, and a virtual reality slice.

C-NEF 208 is configured to securely and deliberately expose information on communication networks sharing converged core communication network 200, as well as on users of these networks, to a network analysis function (not shown). For example, in some embodiments, an artificial intelligence (AI) network analysis function may use C-NEF 208 to determine network performance and suggest network configuration changes to improve network performance. Unlike conventional network exposure functions, C-NEF 208 provides information on both the wireless communication network and the wireline communication network sharing converged core communication network 200, thereby enabling information to be obtained on the collective performance of the wireless and wireline communication networks, e.g., on data sessions traversing both networks. Additionally, certain embodiments of C-NEF 208 are configured to provide information for a single user that may include multi-path data flows, e.g. across both wireless and wireline communication links.

C-NRF 210 is configured to support discovery of network services on communication networks sharing converged core communication network 200. In particular embodiments, an application or operator can access C-NRF 210 to discover and leverage network services from both the wireless and wireline networks sharing converged core communication network 200, and in some embodiments, C-NRF 210 can indicate to the application which services on the wireless and wireline networks share common characteristics or can be used together for a common purpose. For example, an application may use C-NRF 210 to identify a network service at least partially supported by wireline communication link 118, or an application may use C-NRF 210 to identify a network service spanning both wireless communication link 114 and wireline communication link 118.

AF 216 is configured to request dynamic policies and/or charging control. In some embodiments, AF 216 is used only for wireless network access. In certain embodiments, AF 216, AMF 212, AUSF 214, and SMF 218 operate according to 5G NR standards.

Figure 3:
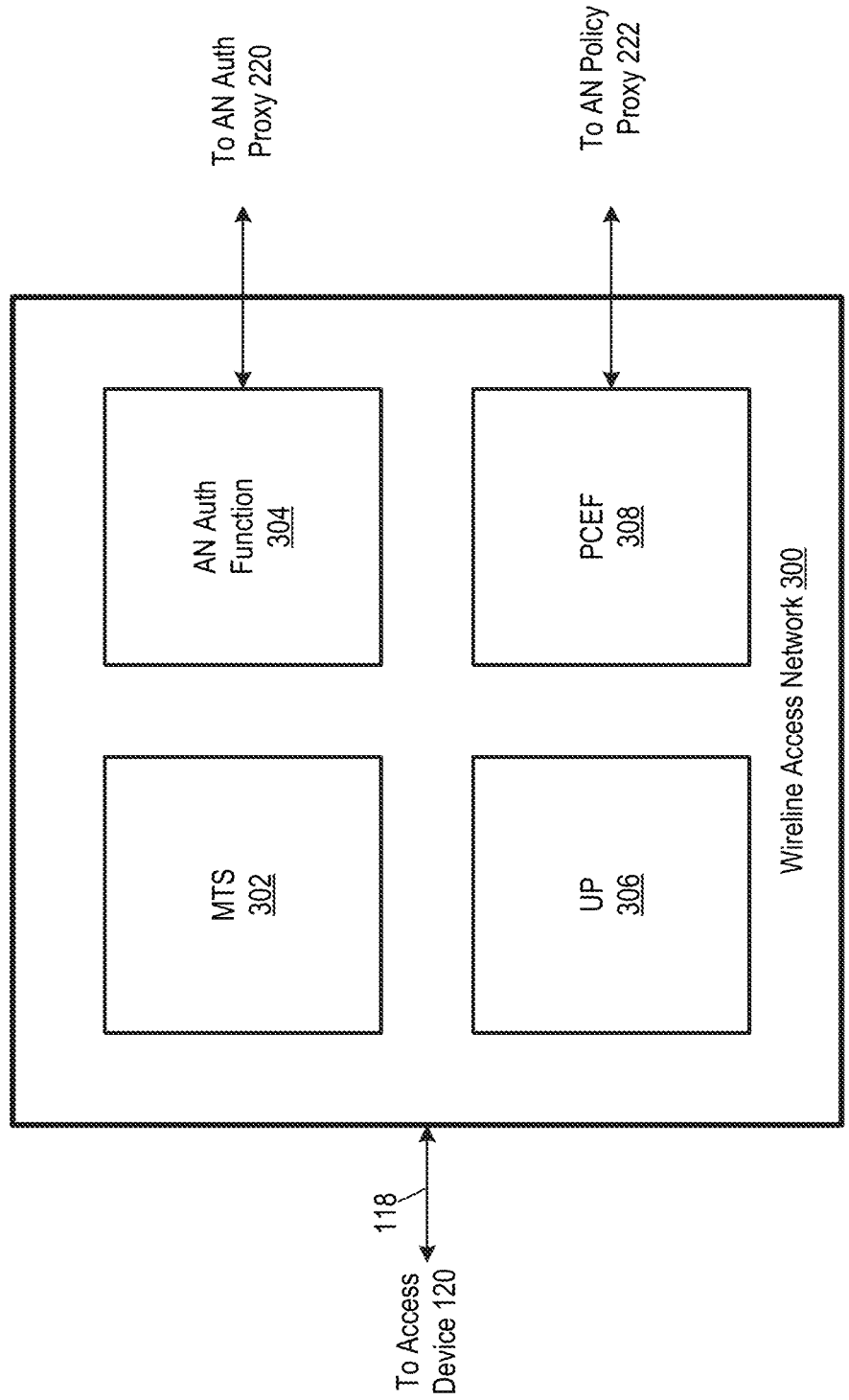
FIG. 3 is a block diagram illustrating a wireline access network, according to an embodiment.

FIG. 3 is a block diagram illustrating a wireline access network 300, which is one possible embodiment of wireline access network 122 of FIG. 2. It should be appreciated, however, that wireline access network 122 could have other configurations without departing from the scope hereof.

Wireline access network 300 includes the following network functions: (a) a modem termination system (MTS), (b) an AN authorization function 304, (c) a user plane (UP) function 306, and (d) a policy charging and enforcement function (PCEF) 308. In some embodiments, wireless access network 300 includes a processing subsystem (not shown) and a memory subsystem (not shown), where the processing subsystem executes instructions stored in the memory subsystem to provide the network functions of wireline access network 300. MTS 302 terminates wireline communication link 118. Examples of MTS 302 include, but are not limited to a CMTS, a DSLAM, an OLT, an optical network terminal, an optical network unit, and a network terminal. However, MTS 302 is not limited to these configurations; to the contrary, MTS 302 can have any configuration as long as it is capable of terminating wireline communication links. In some embodiments, MTS 302 also schedules transfer of data packets among wireline communication link 118. As discussed above, in some embodiments, wireline communication link 118 includes a coaxial cable, an optical cable, a twisted pair cable, or a hybrid of two or more cables, such as a hybrid of an optical cable and a coaxial cable or a hybrid of an optical cable and a twisted pair cable.

AN authorization function 304 authenticates wireline access devices, such as access device 122. In particular embodiments, AN authorization function 304 obtains device and/or user authentication information from C-UDM 202 of converged core communication network 200. User plane (UP) function 306 launches user planes in wireline access network 300, and PCEF 308 enforces traffic policy information obtained from C-PCF 204 on data sessions traversing wireline communication links of wireline access network 300. In some alternate embodiments, UP function 306 is omitted and wireless access network 300 relies solely on user planes created by converged core communication network 200 for data transmission.

Discussed below with respect to FIGS. 4-7 are several possible applications of converged core communication network 200. It should be realized, though, that converged core communication network 200 is not limited to these example applications.

Figure 4:
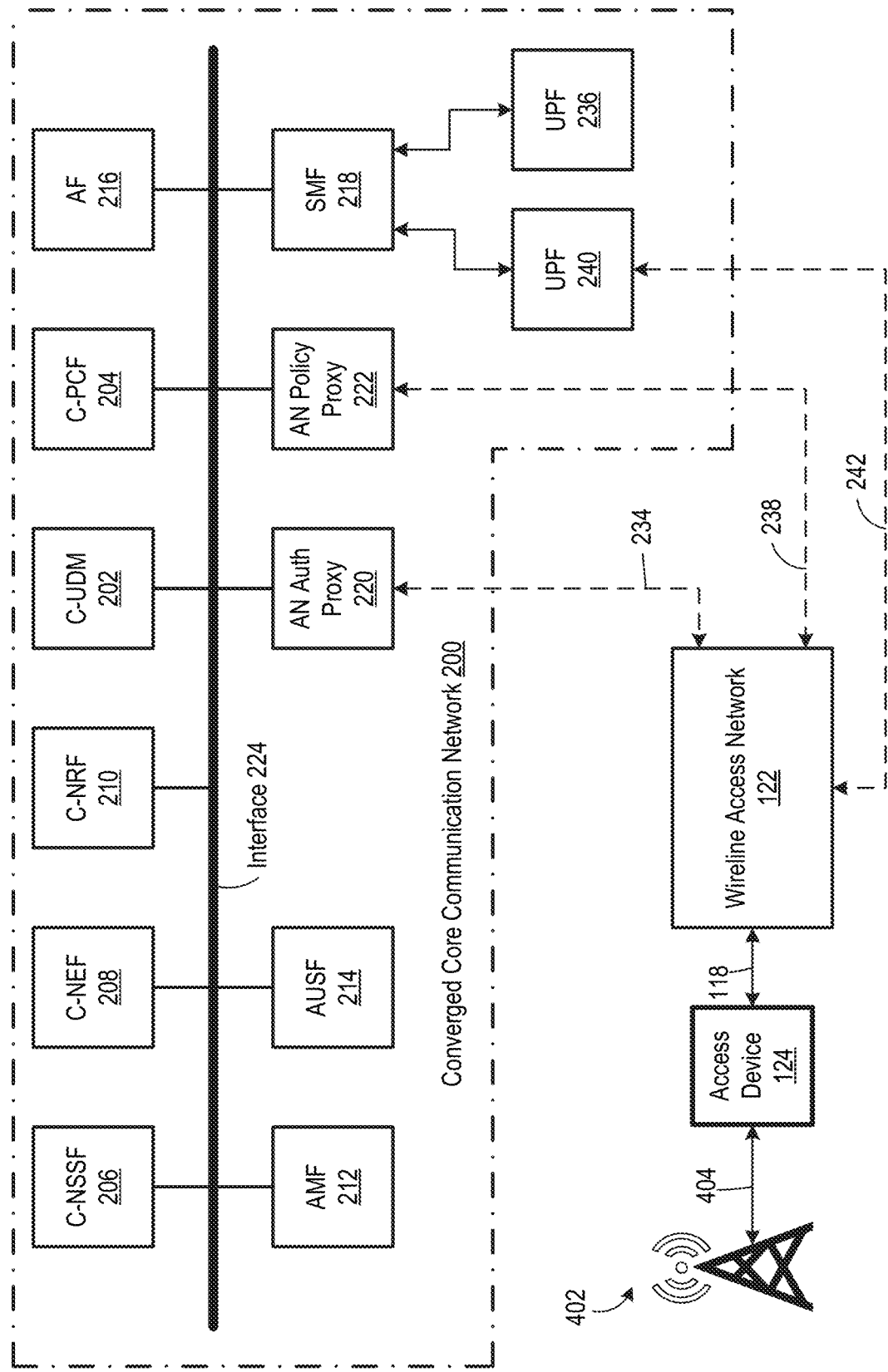
FIG. 4 is a block diagram illustrating an application of the converged core communication network of FIG. 2 where a wireline access network provides backhaul for a wireless base station, according to an embodiment.

FIG. 4 is a block diagram of an application of converged core communication network 200 where wireline access network 122 provides a backhaul communication link for a wireless base station 402. A communication link 404, e.g., an electrical, optical, or wireless communication link, communicatively couples wireless base station 402 to access device 124. Wireless base station 402 is, for example, a LTE base station (e.g., an eNB device), a 5G NR base station (e.g., a gNB device), a 6G wireless communication base station, a Wi-Fi base station (e.g., including unscheduled, partially scheduled, and unscheduled systems), or variations and/or extensions thereof. In some embodiments, wireless base station 402 is a "small cell," i.e. a wireless base station for providing service in small geographic area, such as within a building. In this embodiment, C-NSSF 206 is optionally configured to provide a slice for a data session traversing both wireline communication link 118 and a wireless communication link (not shown) associated with wireless base station 402.

Figure 5:
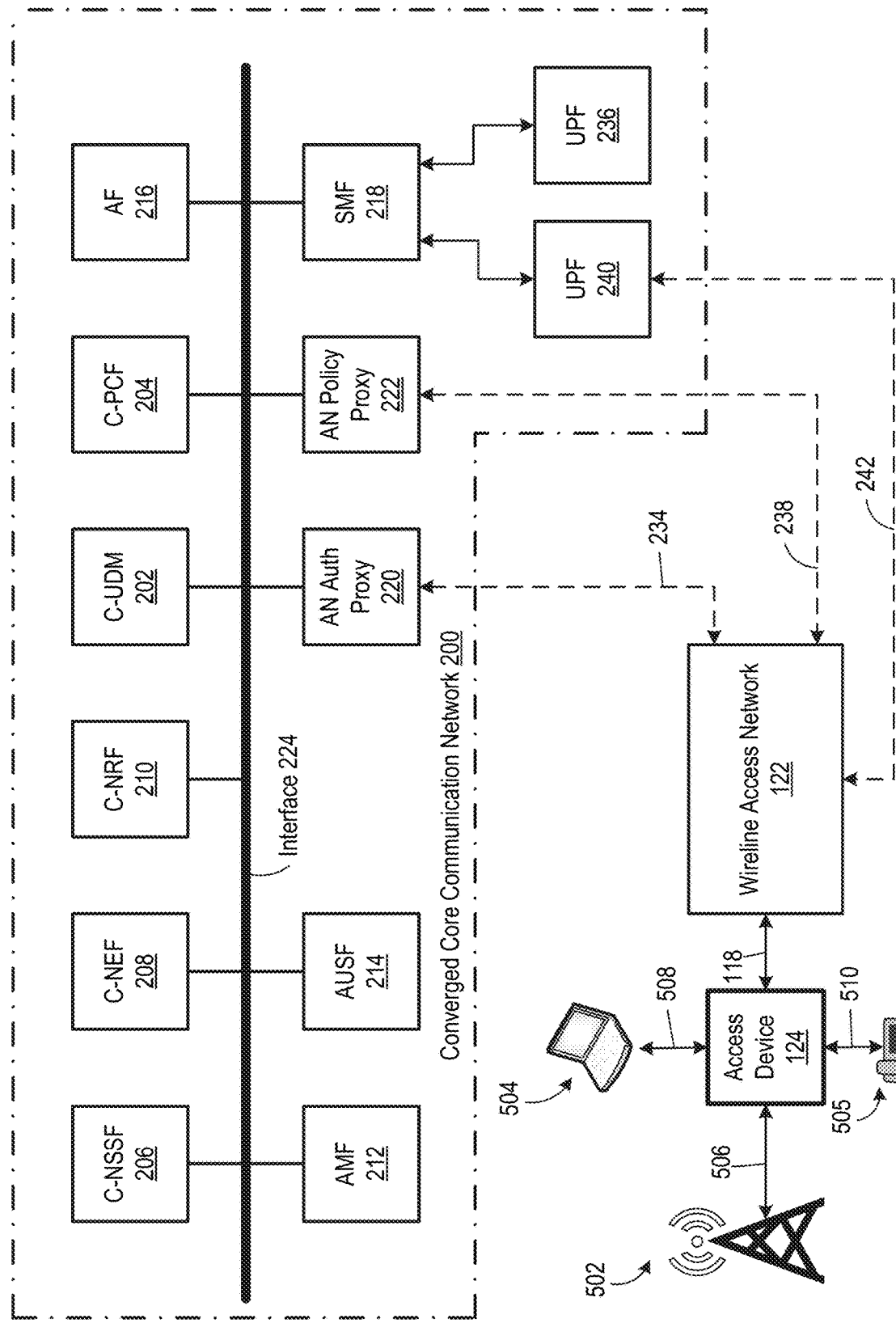
FIG. 5 is a block diagram illustrating an application of the converged core communication network of FIG. 2 where a wireline access network provides (1) backhaul for a small cell wireless base station, (2) fixed broadband Internet service, and (3) optional fixed voice service, according to an embodiment.

FIG. 5 is a block diagram illustrating an application of converged core communication network 200 where wireline access network 122 provides (1) backhaul for a small cell wireless base station 502 and (2) broadband Internet access, such as for one or more UE devices 504. Additionally, wireless access network 122 optionally also provides support for fixed voice service via a telephone 505. In this embodiment, access device 124 is implemented, for example, by a premises gateway that includes networking functionality in addition to wireline communication network access. The premises gateway may be referred to as a "home gateway" or a "residential gate" in applications intended for residential use. However, the FIG. 5 example application is not limited to residential use.

A communication link 506, e.g., an electrical, optical, or wireless communication link, communicatively couples wireless base station 502 to access device 124. Wireless base station 502 is, for example, a small cell LTE base station (e.g., an eNB device), a small cell NR base station (e.g., a gNB device), a small cell 6G wireless communication base station, a Wi-Fi base station (e.g., including unscheduled, partially scheduled, and unscheduled systems), or variations and/or extensions thereof. A communication link 508 (e.g., wireline or wireless) communicatively couples UE device 504 with access device 124, and a communication link 510 (e.g., wireline or wireless) communicatively couples optional telephone 505 with access device 124.

In this embodiment, C-UDM 202 optionally includes a subscription profile associated with access device 124 that includes fixed broadband service, mobile telephone service, and wireless service, where the wireless service is provided by small cell wireless base station 502. Additionally, C-UDM 202 optionally includes a subscription profile associated with access device 124 that includes fixed voice service for telephone 505 in embodiments supporting such service. C-NSSF 206 is optionally configured to provide respective slices for each of these services, with optional QoS traffic management policy for these slices. For example, C-NSSF 206 may be configured to provide one or more of the following slices: (a) a slice spanning wireline communication network 118 and a wireless communication link (not shown) associated with wireless base station 502 for mobile broadband service, (b) a slice spanning wireline communication network 118 and a wireless communication link (not shown) associated with wireless base station 502 for mobile voice service, (c) a slice spanning wireline communication network 118 for fixed broadband service, and (d) a slice spanning wireline communication network 118 for fixed voice service.

Figure 6:
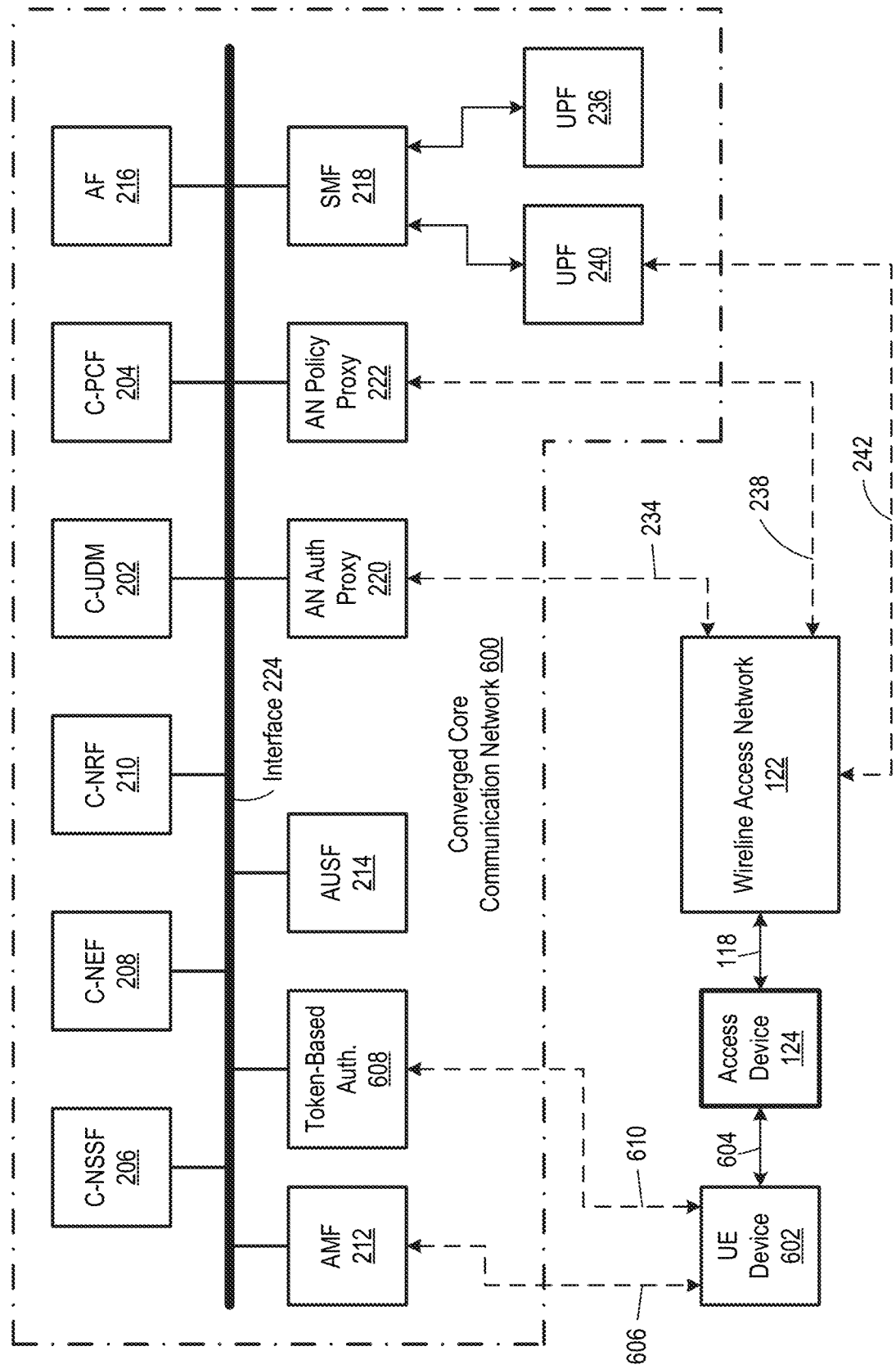
FIG. 6 is a block diagram illustrating a converged core communication network capable of controlling a UE device served by a wireline access network, according to an embodiment.

Some wireline access networks may have limited ability (or no ability) to control client UE devices. Accordingly, in some embodiments, converged core communication network 200 is configured to control UE devices served by wireline access network 122. For example, FIG. 6 is a block diagram illustrating a converged core communication network 600 capable of controlling a UE device 602 served by wireline access network 122. UE device 602 is communicatively coupled to access device 124 via a communication link 604 which is, for example, a wired and/or wireless communication link. Converged core communication network 600 is similar to converged core communication network 200 of FIG. 2, but converged core communication network 600 is further configured to control UE device 602. Is should be noted that UE device 602 need not necessarily be a device designed for use on a wireless communication network; instead UE device 602 could be any one of a computer, a set-top device, a data storage device, an Internet of Things (IoT) device, an entertainment device, a wireless access point (including, for example, eNBs, gNBs, and Wi-Fi APS acting as UEs), a computer networking device, a mobile telephone, a smartwatch, a wearable device with wireless capability, or a medical device, for example.

UE device 602 is logically connected to AMF 212 via a logical link 606, and in some embodiments, logical link 606 is 5G N1G logical link. Converged core communication network 600 controls UE device 602 in manner similar to how converged core communication network 200 controls UE device 116, e.g., using 5G NR techniques. However, in some applications, UE device 602 may use token or certificate-based authentication, instead of authentication based on an IMSI and an AKA. Therefore, converged core communication network 600 optionally includes a token-based authentication 608 network function for authenticating an UE device 602 that require a token or certificate for authentication. Token-based authentication 608 obtains the token/certificate for UE device 602, for example, from C-UDM 202, and token-based authentication 608 interacts with UE device 602 via a logical link 610.

Figure 7:
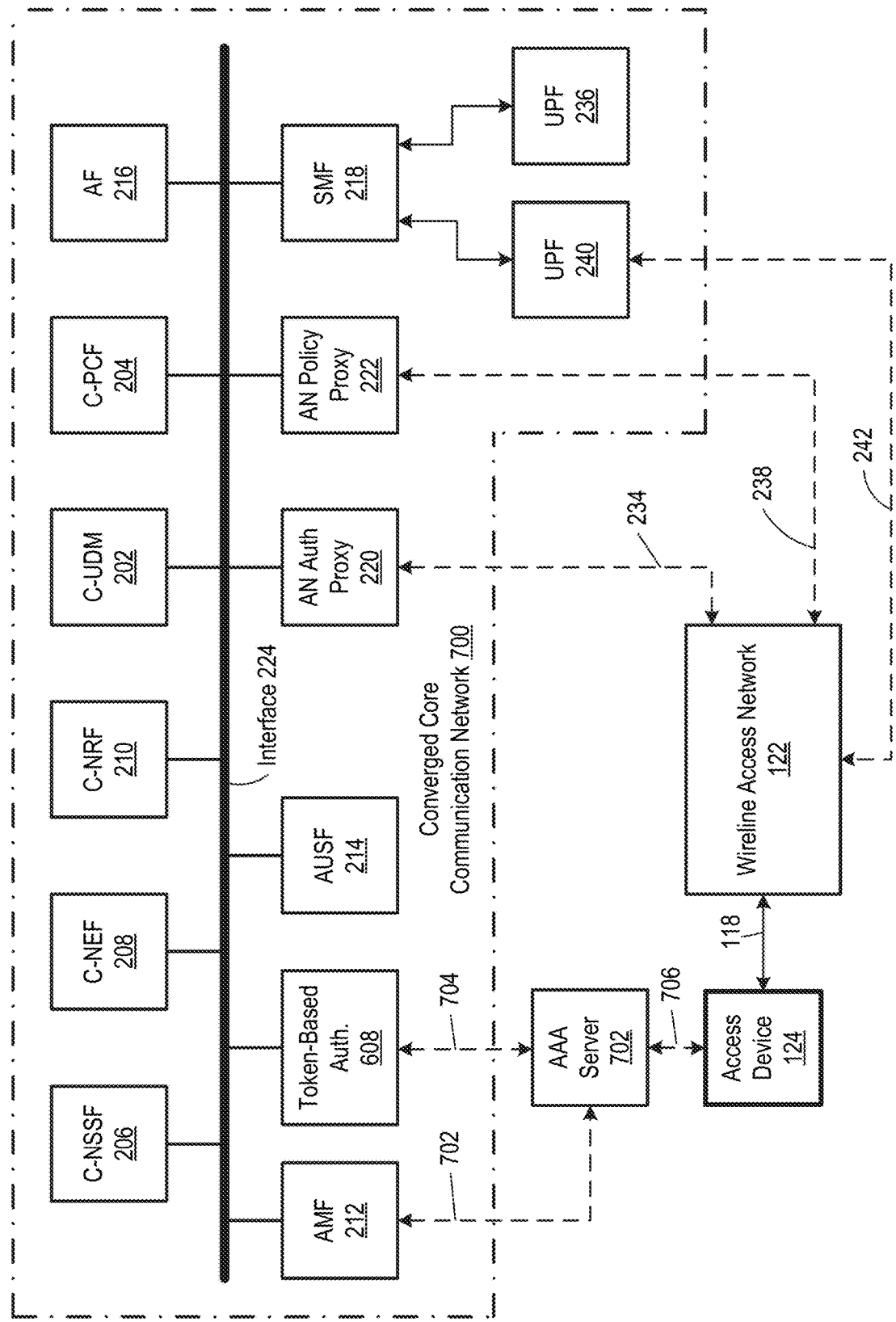
FIG. 7 is a block diagram illustrating a converged core communication network capable of controlling an access device as if the access device were a UE device, according to an embodiment.

In some embodiments, converged core communication network 200 is configured to control access device 124, e.g. in embodiments where access device is embodied as a premises gateway. For example, FIG. 7 is a block diagram illustrating a converged core communication network 700 that is capable of controlling access device 124 as if access device 124 were a UE device. Converged core communication network 700 is similar to converged core communication network 600 of FIG. 6. For example, converged core communication network 700 also includes token-based authentication 608 network function for authenticating access device 124 in embodiments where access device 124 requires a token or certificate for authentication. Access device 124 is authenticated and controlled in this embodiment via converged communication network 700 as if access device 124 were an UE device. For example, AMF 212, C-UDM 202, and SMF 218 collectively instantiate data sessions requested by access device 124. As another example, C-PCF 204 specifies a traffic policy for enforcement by access device 124.

However, access device 124 does not use the same protocols as converged core communication network 700. Therefore, an authentication, authorization, and accounting (AAA) server 702 is included to translate control information between converged core communication network 700 and access device 124. AAA server 702 is communicatively coupled to converged core communication network 700 by logical links 702 and 704, and AAA 702 is communicatively coupled to access device 702 by a logical link 706. In some embodiments, logical link 702 is a 5G N1 logical link, and logical link 706 is AAA logical link, and AAA server 702 translates between 5G N1 protocols and AAA protocols.

Figure 8:
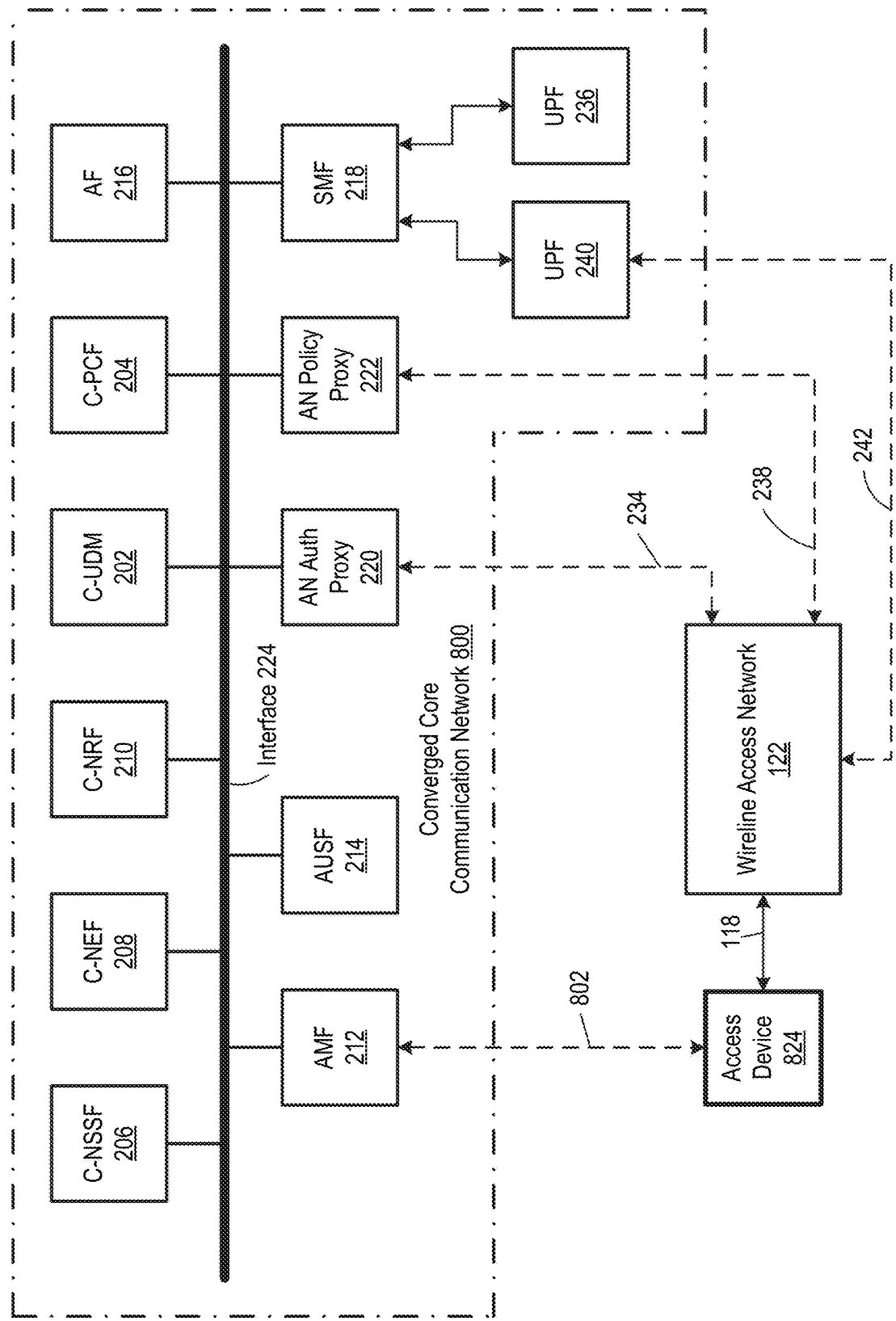
FIG. 8 is a block diagram illustrating a converged core communication network capable of controlling an access device using the same protocols as the converged core communication network, according to an embodiment.

In some embodiments, access device 124 is configured to operate with the same protocols as converged core communication network 200, and in these embodiments, AAA server 702 may be omitted. FIG. 8 illustrates one such embodiment. Specifically, FIG. 8 is a block diagram illustrating a converged core communication network 800 that is capable of controlling an access device 824, where access device 824 is an embodiment of access device 124 that uses the same protocols as converged core communication network 800. Converged core communication network 800 is similar to converged core communication network 700 but with token-based authentication 608 omitted. In some embodiments, access device 824 communicates with converged core communication network 800 via a logical link 802 to AMF 212, where logical link 802 is, for example, a 5G N1G logical link. Converged core communication network 800 controls access device 824 as if it were a wireless UE device, e.g. using 5G NR techniques. For example, AMF 212, C-UDM 202, and SMF 218 collectively instantiate data sessions requested by access device 824. As another example, C-PCF 204 specifies a traffic policy for enforcement by access device 824.

Figure 9:
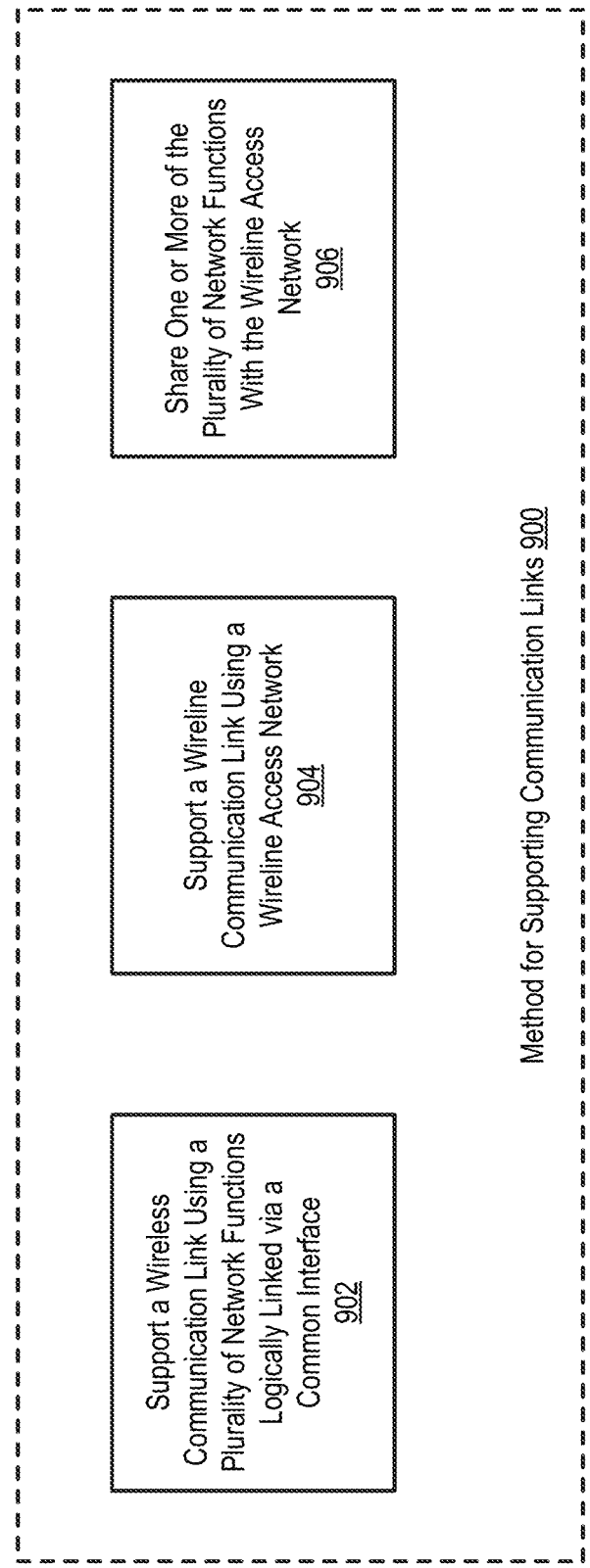
FIG. 9 is a block diagram illustrating a method for supporting communication links, according to an embodiment.

FIG. 9 is a block diagram illustrating a method 900 for supporting communication links, according to an embodiment. In a block 902, a wireless communication link is supported using a plurality of network functions logically linked via a common interface. In one example of block 902, networks functions C-UDM 202, C-PCF 204, C-NSSF 206, C-NEF 208, C-NRF 210, AMF 212, AUSF 214, AF 216, and SMF 218 of converged core communication network 200 support wireless communication link 114. In a block 904, a wireline communication link is supported using a wireline access network. In one example of block 904, wireline access network 122 supports wireline communication link 118. In a block 906, one or more of the plurality of network functions are shared with the wireline access network. In one example of block 906, networks functions C-UDM 202, C-PCF 204, C-NSSF 206, C-NEF 208, and C-NRF 210 of converged core communication network 200 are shared with wireline access network 122. Blocks 902, 904, and 906 may be executed concurrently or at different times without departing from the scope hereof.

Combinations of Features

Features described above may be combined in various ways without departing from the scope hereof. The following examples illustrate some possible combinations:

(A1) A method for supporting communication links may include (1) supporting a wireless communication link using a plurality of network functions logically linked via a common interface, (2) supporting a wireline communication link using a wireline access network, and (3) sharing one or more of the plurality of network functions with the wireline access network.

(A2) The method denoted as (A1) may further include bridging one or more interfaces of the wireline access network and the common interface.

(A3) Any one of the methods denoted as (A1) and (A2) may further include (1) authenticating a first user equipment (UE) device using the wireless communication link via a converged unified data management (C-UDM) of the plurality of network functions and (2) posting, in the C-UDM, authentication of an access device using the wireline communication link.

(A4) The method denoted as (A3) may further include using the wireline access network to authenticate the access device.

(A5) Any one of the methods denoted as (A3) and (A4) may further include associating first authentication information for the first UE device and second authentication information for the access device with a common identification element in the C-UDM.

(A6) In the method denoted as (A5), the first authentication information may include a mobile network subscription ID (IMSI) and an authentication protocol (AKA), and the second authentication information may include a security certificate.

(A7) In the method denoted as (A6), the security certificate may include one of a security certificate for a Wi-Fi device and a security certificate for a data over cable service interface specification (DOCSIS) protocol device.

(A8) Any one of the methods denoted as (A1) through (A7) may further include using a converged policy control function (C-PCF) of the plurality of network functions to apply a traffic policy to a data session traversing the wireline communication link.

(A9) The method denoted as (A8) may further include applying a common traffic policy to at least (1) a first data session traversing the wireless communication link and (2) a second data session traversing the wireline communication link, using the C-PCF.

(A10) The method denoted as (A9) may further include supporting a UE device with each of the first data session and the second data session.

(A11) Any one of the methods denoted as (A1) through (A10) may further include using a converged network slice function (C-NSSF) of the plurality of network functions to form a single network slice spanning the wireless communication link and the wireline communication link.

(A12) The method denoted as (A11) may further include providing a single quality of service (QoS) traffic management policy on the single network slice spanning the wireless communication link and the wireline communication link.

(A13) In any one of the methods denoted as (A11) and (A12), the single network slice spanning the wireless communication link and the wireline communication link may include one of a mobile broadband slice, a mobile transport slice, and an Internet of Things (IoT) slice.

(A14) Any one of the methods denoted as (A1) through (A13) may further include using a converged network exposure function (C-NEF) of the plurality of network functions to provide information on the wireless communication link and the wireline communication link, to a network analysis function.

(A15) The method denoted as (A14) may further include using the C-NEF to determine collective performance of the wireless communication link and the wireline communication link.

(A16) Any one of the methods denoted as (A1) through (A15) may further include using a converged network repository function (C-NRF) of the plurality of network functions to identify a network service at least partially supported by the wireline communication link.

(A17) The method denoted as (A16) may further include using the C-NRF to identify a network service spanning the wireless communication link and the wireline communication link.

(A18) In any one of the methods denoted as (A1) through (A17), the wireless communication link may operate according to a fifth generation (5G) new radio (NR) protocol, and the wireline communication link may operate according to a data over cable service interface specification (DOCSIS) protocol.

(A19) In any one of the methods denoted as (A1) through (A17), the wireless communication link may operate according to a fifth generation (5G) new radio (NR) protocol, and the wireline communication link may operate according to a digital subscriber line (DSL) protocol.

(A20) In any one of the methods denoted as (A1) through (A17), the wireless communication link may operate according to a fifth generation (5G) new radio (NR) protocol, and the wireline communication link may serve a Wi-Fi wireless base station.

(A21) Any one of the methods denoted as (A1) through (A20) may further include supporting (a) a wireless base station and (b) premises broadband access, using the wireline access network.

(B1) A converged core communication network may include (1) a memory subsystem and (2) a processing subsystem configured to execute instructions stored in the memory subsection to perform any one of the methods denoted as (A1) through (A21).

(B2) In the converged core communication network denoted as (B1), the memory subsystem may include a plurality of memory elements disposed at different respective locations, and the processing subsystem may include a plurality of processing elements disposed at different respective locations.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for supporting communication links, comprising:
    supporting a wireless communication link using a converged core communication network;
    authenticating a first user equipment (UE) device using the wireless communication link via a converged unified data management (C-UDM) of the converged core communication network;
    performing, in a wireline access network, authentication of an access device connected to the wireline access network via a wireline communication link between the wireline access network and the access device, the wireline access network being separate from the converged core communication network; and
    at the wireline access network, obtaining a traffic policy from a converged policy control function (C-PCF) of a plurality of network f unctions and applying the traffic policy to a data session traversing the wireline communication link between the wireline access network and the access device after sending, to the C-UDM of the converged core communication network, notification of authentication of the access device by the wireline access network to apprise the converged core communication network of authentication of the access device by the wireline access network, without authenticating the access device on the converged core communication network.

2. The method of claim 1, further comprising associating first authentication information for the first UE device and second authentication information for the access device with a common identification element in the C-UDM.

3. The method of claim 2, wherein:
    the first authentication information comprises a mobile network subscription ID (IMSI) aid an authentication protocol (AKA); and
    the second authentication information comprises a security certificate.

4. The method of claim 3, wherein the security certificate comprises one of a security certificate for a Wi-Fi device and a security certificate for a data over cable service interface specification (DOCSIS) protocol device.

5. The method of claim 1, further comprising applying a common traffic policy to at least (a) a first data session traversing the wireless communication link and (b) a second data session traversing the wireline communication link between the wireline access network and the access device, using the C-PCF.

6. The method of claim 5, further comprising supporting a single user equipment (UE) device with each of the first data session and the second data session.

7. The method of claim 6, further comprising providing a single quality of service (QoS) traffic management policy on a single end-to-end network slice spanning the wireless communication link and the wireline communication link between the wireline access network and the access device.

8. The method of claim 7, wherein the single end-to-end network slice spanning the wireless communication link and the wireline communication link between the wireline access network and the access device comprises one of a mobile broadband slice, a mobile transport slice, and an Internet of Things (IoT) slice.

9. The method of claim 1, wherein supporting the wireless communication link using the converged core communication network comprises supporting the wireless communication link using one of fifth generation (5G) new radio (NR) protocols and sixth generation (6G) protocols.

* * * * *